(No Model.)

F. GABLER.
CAR BRAKE.

No. 490,554. Patented Jan. 24, 1893.

WITNESSES:
Fred G. Dieterich
H. J. Robinson

INVENTOR
F. Gabler.
BY Munn & Co.
ATTORNEYS.

UNITED STATES PATENT OFFICE.

FERDINAND GABLER, OF TOPEKA, KANSAS.

CAR-BRAKE.

SPECIFICATION forming part of Letters Patent No. 490,554, dated January 24, 1893.

Application filed March 21, 1892. Serial No. 425,864. (No model.)

*To all whom it may concern:*

Be it known that I, FERDINAND GABLER, a citizen of the United States, residing at Topeka, in the county of Shawnee and State of Kansas, have invented certain new and useful Improvements in Brakes, of which the following is a specification.

This invention relates generally to brakes, and particularly to an improved wheel brake for railway cars.

The invention relates also to a novel construction of brake shoe.

In wheel brakes as commonly constructed, the brake mechanism is attached to the bottom of car and the brake shoes are also suspended from the bottom of car frame.

The object of this invention is to provide a brake the mechanism of which shall be attached to the under portion of the wheel truck, and one in which the shoes are also suspended from said truck.

With these objects in view my invention consists in the peculiar construction of the several parts and their novel combination or arrangement all of which will be more fully hereinafter described and pointed out in the claims.

Figure 1:
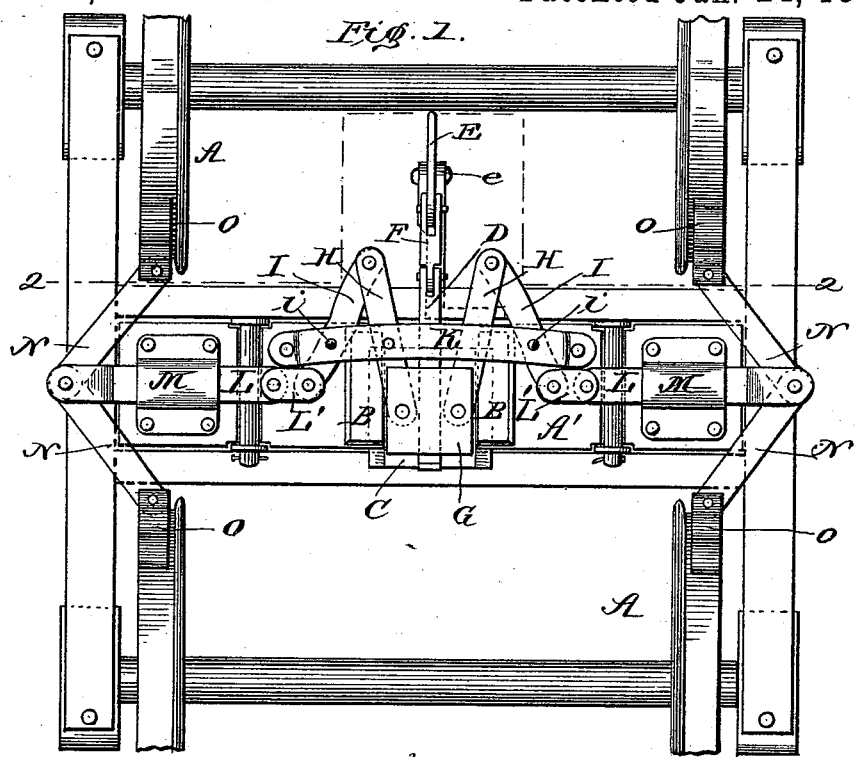
Figure 2:
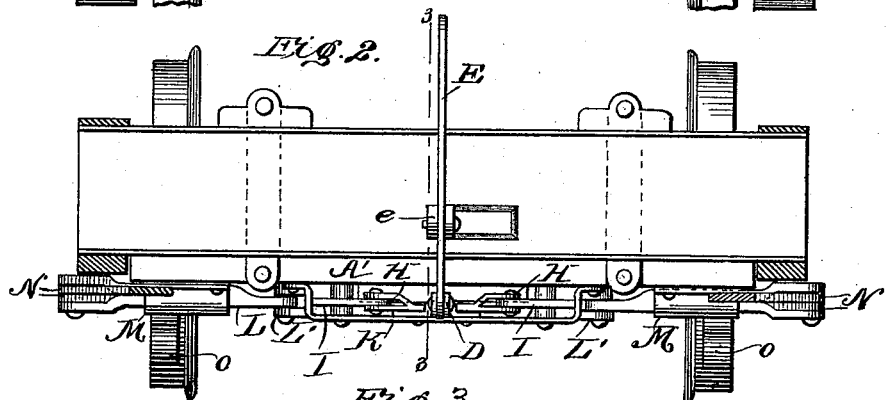
Figure 3:
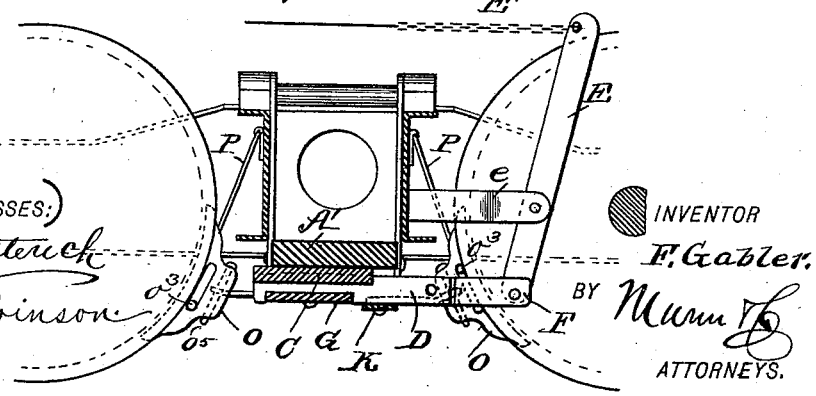

In the drawings forming a part of this specification Figure 1 is an inverted plan view of my improved brake. Fig. 2 is a section on line 2—2 and Fig. 3 is a section on line 3—3.

Referring to the drawings A indicates an ordinary wheel truck provided with a "sand board" A', arranged between the transverse beams of the truck at the lower ends of the same. Near the center of the sand board and upon the under side of the same are secured the parallel guide plates B B, and between these plates slide a block C, the guides having rabbeted inner edges to securely hold the block in proper position. A horizontal brake operating bar D is rigidly attached to the underside of the sliding block C, and projects longitudinally beyond one of the transverse beams of the truck. A brake operating lever E is pivoted to an offset e upon the beam adjacent to the free end of bar D and the lower end of this lever is connected with the free end of brake bar D, by means of a link F which is pivotally connected with both the lever and bar so that each may move as explained farther on. A brake chain or rod E' is attached to the upper end of lever E and connects with a shaft or lever on the platform of cars (not shown). A plate G is rigidly secured upon the bar D above the slide block C, said bar properly spacing the plate and block, and between the same, upon opposite sides of the bar D are pivoted the inner ends of the connecting arms H H the outer ends of said arms being pivotally connected with the outer ends of the levers I I which levers are pivoted to the underside of the sand board upon opposite sides of the guide plates as shown at *i i*. A metallic strap or bail K is also secured to the underside of the sand board and extends across the guide plates, slide block, operating bar, connecting arms, and levers; the pivotal bolts *i i* of said levers passing also through said strap. This strap holds the block C, plate G, and bar D, in place, taking a great deal of strain from the plate B; and said strap serves also to limit the outward movements of the levers I, when the brakes are released. The outer ends of the levers I, are connected with the inner ends of the laterally movable rods L L by means of the links L' L', said rods sliding in the guides M M, attached to the sand board and at their outer ends these rods L L connect with the toggle levers N N which carry the brake shoes O O at their outer ends, said shoes being suspended by hanger rods P P attached to the beams of the truck.

From the above description it will appear that I provide a safe and effective brake consisting of a few parts all of which are beneath the body of the truck.

The operation of my device is clear to every one acquainted with railway brakes it being understood that as the brake is applied the toggle levers are drawn inward forcing the shoes against the periphery of the wheels, and that by releasing the brakes the said toggle levers are moved outward drawing the shoes away from the wheels.

Having thus described my invention, what I claim is,

1. In a brake, the combination with a truck, and brake shoes suspended therefrom, of transversely sliding rods, toggle levers pivoted to the outer ends of the said rods and to the brake shoes, a longitudinally sliding block, connections between the said block and rods, and means for operating the said block, substantially as described.

2. In a brake, the combination with toggle levers and brake shoes carried thereby, of transversely sliding rods pivoted at their outer ends to the toggle levers, a longitudinally sliding block, arms pivotally connected with the sliding block, levers pivoted to the ends of the said arms, and links pivoted to the levers and to the sliding rods, substantially as described.

3. The combination with the truck and shoes suspended therefrom, the brake lever and bar, the slide block, the toggle levers, the laterally movable arms connected therewith, the levers attached to the arms, and arms connecting the said levers and slide block substantially as shown and described.

4. The combination with the truck and shoes suspended therefrom, of the toggle levers, the laterally movable arms, the levers connected with said arms, the brake levers, the brake bar, slide block and plate, the connecting arms pivoted between said block and plate and connected with the levers attached to the movable arms, and the metallic strap extended across said parts substantially as shown and described.

FERDINAND GABLER.

Witnesses:
J. T. SWEEZEY,
G. W. SWEEZEY.